Figures 1, 2:
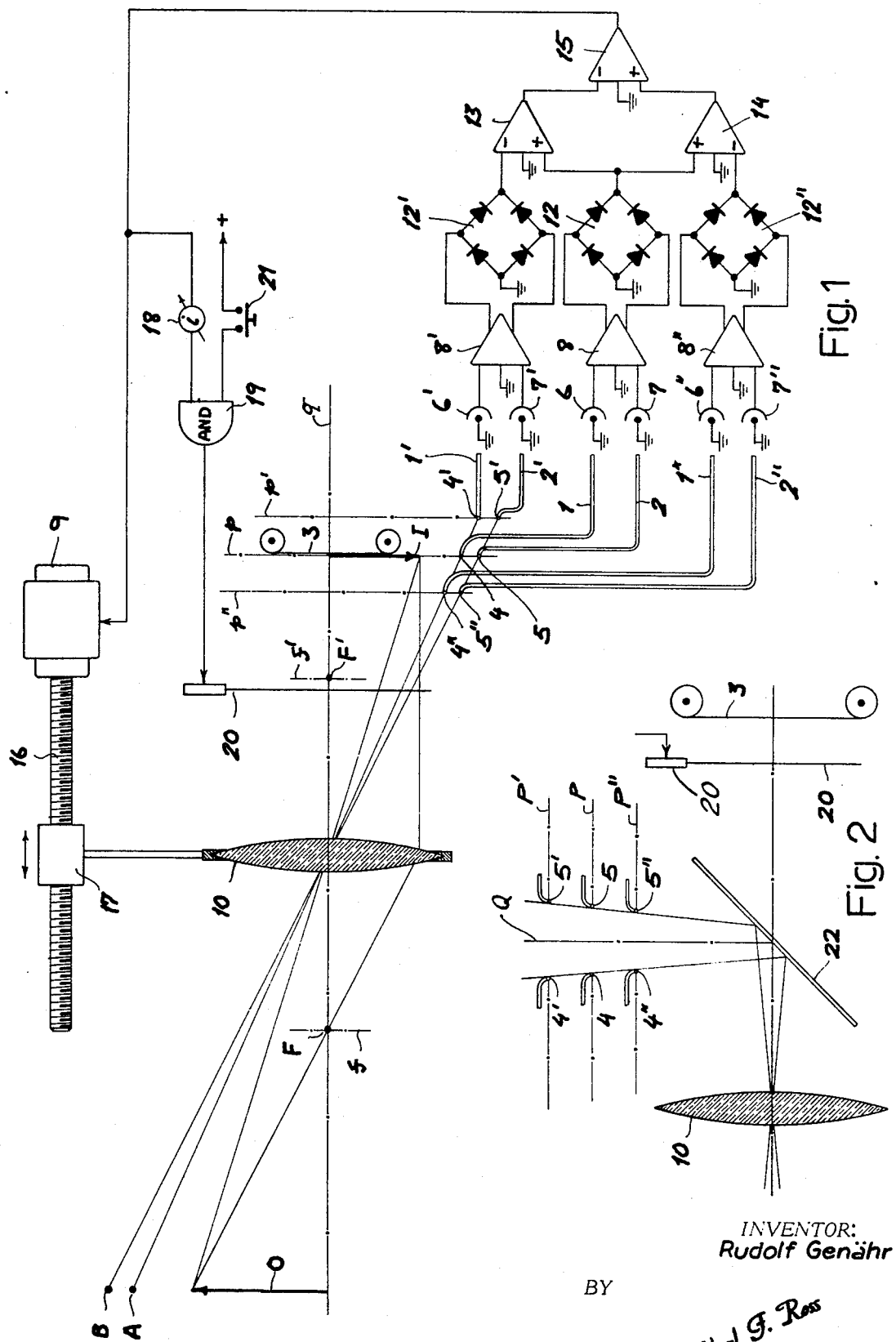

3,532,045

| [72] | Inventor | Rudolf Genähr, Rorschacher Berg, Switzerland |
|---|---|---|
| [21] | Appl. No. | 702,982 |
| [22] | Filed | Feb. 5, 1968 Continuation-in-part of Ser. No. 610,111, Jan. 18, 1967, abandoned |
| [45] | Patented | Oct. 6, 1970 |
| [73] | Assignee | Jos. Schneider & Co., Bad Kreuznach, Germany, a corporation of Germany |
| [32] | Priority | Feb. 18, 1967 |
| [33] | | Germany |
| [31] | | Sch. 40,264 |

[54] METHOD OF AND MEANS FOR FOCUSING AN OPTICAL SYSTEM
7 Claims, 2 Drawing Figs.

[52] U.S. Cl. .................................................. 95/45,
350/46, 350/77, 355/56
[51] Int. Cl. ................................................... G03b 13/28
[50] Field of Search ........................................ 95/44, 45;
350/46, 76, 77; 353/101; 355/55, 56, 63; 95/10

[56] References Cited
UNITED STATES PATENTS

| 2,922,351 | 1/1960 | Hering...................... | 355/56 |
| 3,336,851 | 8/1967 | Warshawsky................ | 355/56 |

*Primary Examiner*—Norton Ansher
*Assistant Examiner*—Richard L. Moses
*Attorney*—Karl F. Ross

ABSTRACT: To focus an optical system, the ends of three pairs of light-conductive fibers are disposed near the secondary focal plane of an objective in different transverse planes to pick up light from a pair of adjacent image points, the middle plane having substantially the same distance from the objective as has the film or other receiving surface onto which the image is to be focused. Relative axial displacement of the receiving surface and all or part of the objective is terminated as soon as the photoelectrically determined difference in light picked up by the middle pair of fibers exceeds that picked up by each of the two other pairs.

Patented Oct. 6, 1970

3,532,045

INVENTOR:
Rudolf Genähr

BY

Karl F. Ross
Attorney

METHOD OF AND MEANS FOR FOCUSING AN OPTICAL SYSTEM

SPECIFICATION

My present invention relates to an automatic focusing system of the type disclosed in my copending U.S. application Ser. No. 610,111, filed Jan. 18, 1967, now abandoned, of which this application is a continuation-in-part.

In that prior application I have shown and described a circuit arrangement using two photoelectric transducers (e.g. photocells or photoconductors) having respective inputs closely spaced in a receiving plane, such as the surface of a photosensitive film or a ground-glass plate of a photographic or cinematographic camera, or in a correlated image plane so as to produce output voltages or currents which, upon comparison in a differential amplifier or the like, give rise to a signal proportional to whatever contrast exists in the intensity of the light rays incident upon the two inputs. A drive means responsive to the output signal of this comparison circuit, such as a servomotor, displaces an objective or a component thereof with reference to the receiving and image plane or planes in a direction tending to maximalize the contrast and, thereby, the differential signal of the transducers.

As further disclosed in my above-identified application, the camera may be of the reflex type with the correlated image plane illuminated from the objective by way of a semitransparent reflector, the distance of this image plane from the objective along the path of the light rays being the same as that measured along the geometrical axis between the objective and the film surface; the optical axis of the system, insofar as this light path is concerned, then coincides only partly with the geometrical axis and partly extends at an angle thereto (usually of 90°). The term axial as used hereinafter is therefore intended to refer to the optical axis which may or may not coincide with the geometrical axis, depending upon the absence or presence of a reflex system.

The arrangement described in my prior application measures the degree of contrast between two image points and the changes in contrast occurring upon a relative axial displacement between the image plane and an objective component under the control of the aforementioned servomotor, such displacement being initiated by the user and being terminated automatically in a position of maximum contrast; to arrive at this position, the reversible servomotor is driven in the direction of increasing contrast until a peak is reached. If, during this focusing operation, the object to be photographed is in motion or changes in luminosity so that the relative brightness of the two test points varies independently of the focal position, prolonged hunting may result since the system cannot discriminate between contrast changes due to focusing or to external causes.

My present improvement aims at remedying the aforestated drawbacks by providing a method of and means for focusing an optical system of the character described in a manner dispensing with the need for starting a servomotor to determine the sense of contrast variation, thereby allowing a picture to be taken instantly if the camera happens to be initially in its proper focusing position.

In accordance with my present invention I measure the light intensity from a pair of transversely spaced image points in three different transverse planes (the term transverse referring to the optical axis of the light path here considered), the middle one of these planes having substantially the same distance from the objective as has the film or other receiving surface onto which the image is to be focused. If the difference in light picked up by the pair of inputs in this middle plane exceeds that from each of the other two planes, the system is considered properly focused and a picture may be taken immediately; if, however, this difference in light intensity is greater in one of the outer planes, the system is refocused until the greatest contrast is measured in the middle plane.

With automatic focusing by means of a reversible servomotor, the latter is driven in one or the other direction, depending on which of the two outer planes exhibits the greatest contrast. Thus, if the region of maximum contrast lies in the forward plane, i.e. the one closest to the objective, the optical path is foreshortened to bring the secondary focal plane of the objective closer to the receiving surface; conversely, if the difference in light intensity is greatest in the rear plane, the servomotor is actuated in the opposite direction to lengthen the optical path so that the distance between the receiving surface and the secondary focal plane is increased.

The automatic focusing operation just described may be performed with the aid of a plurality of cascaded comparator stages including differential amplifiers, the output of the last stage being a signal whose polarity determines the direction of servomotor operation. This arrangement, with suitable damping, virtually eliminates hunting.

As disclosed in my prior application identified above, the transducer inputs designed to pick up the light from a pair of image points may be constituted by the ends of two closely spaced light-conductive fibers; it is, however, also possible to utilize other types of transducers, such as a monocrystalline photoconductive body of the integrated-circuit type as likewise described and illustrated in my copending application.

In accordance with still another feature of my present invention, the output of the comparison means controlling the servomotor may be used for the automatic actuation of a shutter-tripping mechanism so as to take a picture as soon as the system is properly focused. This is particularly advantageous in equipment used by press photographers as well as in television cameras.

Since my improved focusing arrangement measures only the relative values of the absolute magnitudes of the differences in luminous intensity detected in different transverse planes, a change in the brightness or the contrast of the external object will have no influence upon the operation of the system inasmuch as these values will retain their order of relative magnitude which is determined exclusively by the degree of convergence of the focused light rays.

As in the system of my prior application, the two test points may be closely juxtaposed so that only a single section of the projected image is needed for focusing; this section, in fact, may be outside the frame of the picture to be taken, particularly if no reflex mirror is utilized. Thus, the ends of the fiber-optical conductors or other transducer inputs may be separated by a distance substantially equal to the diameter of elemental image units or "grains" (preferably on the order of 20 to 100μ) so that the controlling contrast may be created by minute details such as, say, the features of a single person in a large group of people to be photographed.

Although it is possible to move either the objective or the receiving and test planes to focus the system, it will generally be more convenient to displace only a single component (e.g. a front lens) of the objective and to maintain the receiving surface as well as the transducer inputs stationary.

The invention will be described in greater detail with reference to the accompanying drawing in which:

FIG. 1 is a diagrammatic view of an automatic focusing system embodying my present invention; and FIG. 2 shows a partial modification of the system of FIG. 1.

In FIG. 1, I have shown an optical system of a photographic, cinematographic or television camera designed to photograph an object O; the camera objective is represented diagrammatically by an axially movable lens 10, it being understood that this lens may be supplemented by one or more preferably stationary lenses to the rear thereof. The primary and secondary foci and corresponding focal planes have been indicated at F, F' and f, f'.

A film 3 to be exposed has a receiving surface coinciding with a plane p which is transverse to the optical axis q of the system. This plane p also includes, at a location offset from the axis q, the closely juxtaposed ends 4, 5 of a pair of lightconducting fibers 1, 2 terminating at respective photoelectric transducers 6, 7 here shown as photocells. Another transverse plane $p'$, disposed rearwardly of plane $p$, includes the ends 4′, 5′ of two similar filaments 1′, 2′ extending to respective photocells 6′, 7′. A third transverse plane $p''$, located forwardly of plane p, contains the ends 4″, 5″ of still another pair of light conductors 1″, 2″ leading to a third pair of photocells 6″, 7″. The three planes $p$, $p'$, $p''$ are closely spaced and, for the photographing of objects at finite distances, should be located somewhat to the rear of secondary focal plane $f'$.

The outputs of photocells 6 and 7 are connected to respective inputs of a differential amplifier 8 of a first comparator stage, photocells 6′, 7′ and 6″, 7″ similarly working into two further differential amplifiers 8′, 8″. The output signals of these differential amplifiers, whose polarities are immaterial for present purposes, are rectified in respective bridges 12, 12′ and 12″ and then fed to a second comparator stage consisting of two differential amplifiers 13, 14; more particularly, rectifier bridge 12 is connected to the noninverting inputs (identified by a + sign) of both amplifiers 13 and 14, the output voltage of bridge 12′ being delivered to the inverting (−) input of amplifier 13 while the voltage of bridge 12″ is applied to the corresponding input of amplifier 14. The two amplifiers 13, 14 work into a third-stage differential amplifier 15 whose noninverting (+) input is here shown to receive the signals from amplifier 14. The output of this three-stage comparison circuit which is of either positive or negative polarity, serves to energize a reversible motor 9 which axially displaces the objective component 10 through a transmission here represented by a leadscrew 16 and a mating nut 17.

The system so far described operates as follows:

Objective 10 projects an image I of object O, this image coinciding with the plane $p$ of film 3 if the system is properly focused. In this case there is greater contrast between the image points 4, 5 than between either the image points 4′, 5′ or the image points 4″, 5″, all these image points being conjugate to a pair of object points A, B. With the output of amplifier 8 exceeding that of each of the two other amplifiers 8′, 8″, the noninverted output of amplifier 13 balances that of amplifier 14 and no signal appears in the output of amplifier 15; motor 9 therefore remains stationary.

If, however, the system is out of focus, image I may coincide or nearly coincide with, say, the plane $p'$ so that the differential signal developed in the input of amplifier 8′ is greater than that applied to amplifiers 8 and 8″. Now, the inverted output of amplifier 13 dominates the inverted or noninverted output, if any, of amplifier 14 so that the motor 9 receives a signal of negative polarity and drives the lens 10 forward (i.e. to the left), thus lengthening the light path from objective 10 to receiving surface 3 until the image I again coincides with plane $p$ and motor 9 stops.

Conversely, if the image I had been formed in the vicinity of plane $p''$, fiber ends 4″, 5″ would have detected the greatest contrast so that the inverted output of amplifier 14 would have dominated the output of either polarity, if any, of amplifier 13 and would have generated a signal of positive polarity in the output of amplifier 15, thereby operating the motor 9 to drive the lens 10 in a backward direction (to the right) until, again, the image I substantially registers with plane $p$.

The points A and B may lie anywhere within the depth-of-field range of the objective to insure proper focusing. In the unusual situation in which no substantial contrast exists anywhere within the region focused upon the fiber ends 4, 4′, 4″ and 5, 5′, 5″, the objective could of course be manually prefocused with the aid of conventional means such as a ground-glass plate.

Once the system has been manually or otherwise prefocused upon an object or scene including the two points A, B of different luminosity, with the images of these points falling onto or close to the plane $p$, any change in the relative distance between the camera and the object plane will operate the contrast detector described above so that motor 9 will shift the objective 10 to compensate for such displacement. Thus, my system may be used in tracking a moving object to keep it in focus between the initial adjustment and the taking of a picture, or between the taking of a succession of pictures (as in a movie camera).

As further illustrated in FIG. 1, a shutter 20 may be disposed ahead of the receiving surface 3 so as to obstruct the film but not the fiber ends 4, 5 etc. An inverter 18 feeds the output of amplifier 15 to an AND gate 19 whose other input is energizable by way of a pushbutton switch 21. Upon closure of switch 21, AND gate 19 will conduct as soon as the output signal of amplifier 15 drops to zero; this trips the actuating mechanism of shutter 20 which opens momentarily to expose the film.

In FIG. 2, I have shown a modification of the system wherein the light rays from objective 10 are partly deflected by a semisilvered mirror 22 along an axis Q toward the three pairs of fiber ends 4, 5; 4′, 5′; 4″, 5″. As before, these pairs of transducer inputs are disposed in three planes P, P′, P″ transverse to the optical axis Q, the middle plane P having the same effective distance from lens 10 as has the receiving surface 3 which coincides with the correlate plane $p$ (FIG. 1). The shutter 20, operable as in the previous embodiment upon proper focusing, is interposed between the mirror 22 and the film 3.

In contradistinction to the system of FIG. 1, the modification of FIG. 2 affords greater freedom in choosing the two image points whose relative light intensity is a measure of the deviation, if any, of the receiving surface from the image plane. It will be noted that corresponding points 4, 4′, 4″ and 5, 5′, 5″ are located in each embodiment on the same pair of principal rays.

I claim:

1. A method of focusing an optical system having control means for relatively displacing a receiving surface and at least part of an associated objective along the optical axis of the objective, comprising the steps of picking up light from a pair of transversely spaced image points in each of three transverse planes including a middle plane having substantially the same distance as said receiving surface from said objective, operating said control means while comparing the difference between the light of said image points picked up in said middle plane with the corresponding differences from the other two planes, and arresting said control means upon the difference of light from said middle plane exceeding that from said other planes.

2. In an optical system having objective means for projecting an image of an external object onto a receiving surface, said objective means having at least a component displaceable relatively to said receiving surface for focusing said image, the combination therewith of a first pair of photoelectric transducers having inputs disposed at two points in a first transverse plane having substantially the same distance as said receiving surface from said objective, a second pair of photoelectric transducers having inputs disposed at two corresponding points in a second transverse plane forwardly of said first plane, a third pair of photoelectric transducers having inputs disposed at two corresponding points in a third transverse plane rearwardly of said first plane, and comparison means connected to the outputs of said first, second and third pairs of transducers for indicating the relative values of the absolute magnitudes of the difference in light picked up by said inputs in said first, second and third planes in different relative axial positions of said component and said receiving surface.

3. The combination defined in claim 2, further including a set of fiber-optical light conductors terminating at said transducers, said inputs being respective ends of said conductors.

4. The combination defined in claim 2, further comprising automatic control means for relatively shifting said component and said receiving surface, said comparison means having an output connected to said control means for arresting same in a position in which the light contrast at said inputs in said first plane exceeds the light contrasts at said inputs in both said second and third planes.

5. The combination defined in claim 4 wherein said comparison means includes a plurality of differential-amplifier means connected in cascade.

6. The combination defined in claim 4, further comprising shutter means normally blocking the path of light rays from said objective means to said receiving surface but not to said inputs.

7. The combination defined in claim 6, further comprising actuating means for said shutter means responsive to the output of said comparison means for momentarily opening said shutter means upon the arresting of said control means.